(12) United States Patent
Ono

(10) Patent No.: US 7,653,298 B2
(45) Date of Patent: Jan. 26, 2010

(54) IMAGE CAPTURING APPARATUS, IMAGE CAPTURING METHOD, IMAGE CAPTURING PROGRAM, IMAGE RECORDING OUTPUT SYSTEM AND IMAGE RECORDING OUTPUT METHOD

(75) Inventor: Shuji Ono, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 524 days.

(21) Appl. No.: 11/366,557

(22) Filed: Mar. 3, 2006

(65) Prior Publication Data

US 2006/0198623 A1 Sep. 7, 2006

(30) Foreign Application Priority Data

Mar. 3, 2005 (JP) ............................. 2005-059430

(51) Int. Cl.
*G03B 3/10* (2006.01)
(52) U.S. Cl. ........................ 396/121; 396/322
(58) Field of Classification Search ................ 382/255; 396/121, 322; 348/348
See application file for complete search history.

(56) References Cited

U.S. PATENT DOCUMENTS 3,730,067 A * 5/1973 Seely ........................ 396/139
3,790,252 A * 2/1974 Pao ............................. 359/299
5,051,770 A * 9/1991 Cornuejols ................... 396/125
5,729,290 A * 3/1998 Tokumitsu et al. ........... 348/349
6,765,618 B1 * 7/2004 Sato ............................ 348/348
2002/0080257 A1 * 6/2002 Blank .......................... 348/345
2002/0102102 A1 * 8/2002 Watanabe et al. ............. 396/89
2003/0081137 A1 * 5/2003 Yamazaki .................... 348/354
2004/0080661 A1 * 4/2004 Afsenius et al. ............. 348/345
2004/0174455 A1 * 9/2004 Soga .......................... 348/348

FOREIGN PATENT DOCUMENTS

JP 9-65194 A 3/1997

* cited by examiner

*Primary Examiner*—Christopher Mahoney
(74) *Attorney, Agent, or Firm*—Birch, Stewart, Kolasch & Birch, LLP

(57) ABSTRACT

To provide an image in which a plurality of subjects are focused and which has an extended depth of field even if the image capturing apparatus captures a plurality of subjects with different focus distances each other. The image capturing apparatus includes: a focus control section for focusing on each of the plurality of subjects; an image capturing section for capturing a first captured image when the focus control section focuses on a first focus distance, and for capturing a second captured image when the focus control section focuses on a second focus distance; an image generating section for generating capturing range image information by combining the first captured image and the second captured image; and a moving image recording section for recording plural pieces of capturing range image information as moving image data.

5 Claims, 11 Drawing Sheets

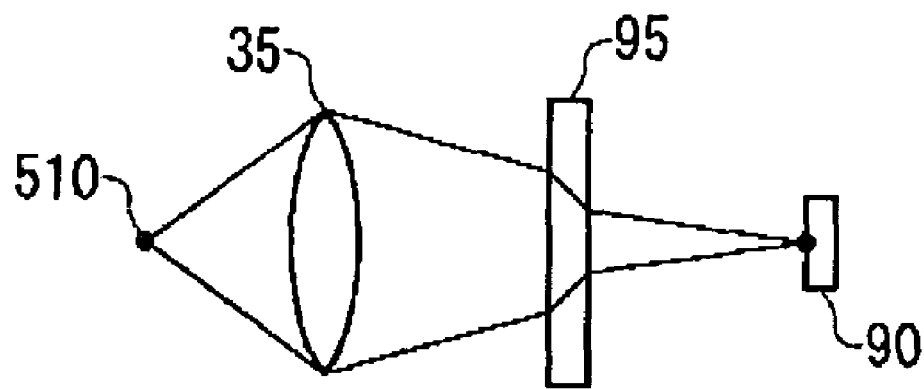
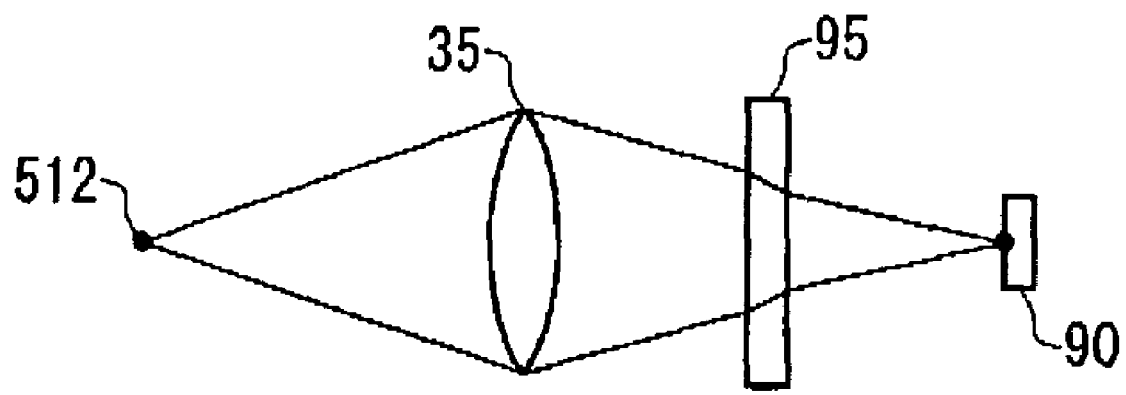
FIG. 5

IMAGE CAPTURING APPARATUS, IMAGE CAPTURING METHOD, IMAGE CAPTURING PROGRAM, IMAGE RECORDING OUTPUT SYSTEM AND IMAGE RECORDING OUTPUT METHOD

CROSS REFERENCE TO RELATED APPLICATION

The present claims priority from Japanese Patent Application No. JP 2005-059430 filed on Mar. 3, 2005, the contents of which are incorporated herein by reference.

BACKGROUND OF THE INVENTION

1. Field of the Invention

The present invention relates to an image capturing apparatus, an image capturing method, an image capturing program, an image recording output system and image recording output method. Particularly, the present invention relates to an image capturing apparatus, an image capturing method and an image capturing program for capturing moving images, and an image recording output system and an image recording output method for recording images and outputting the same.

2. Related Art

Conventionally, a method has been proposed, for capturing images having the highest MTF (modulation transfer function) value in the on-optical axis (the center of captured image) and the out-optical axis (the region except for the center of the captured image) and then, combining a plurality of captured images as disclosed in Japanese Patent Application Publication No. 9-065194.

In the above disclosed invention, a portion with the highest MTF value (the highest contrast) in each axis direction is focused. Therefore, it is difficult to focus on each subject when a plurality of subjects are included in each axis direction. That is to say, there has been a problem that it is difficult to provide an image in which each of the plurality of subjects is focused.

SUMMARY OF THE INVENTION

Thus, it is an object of the present invention to provide an image capturing apparatus, an image capturing method, an image capturing program, an image recording output system and an image recording output method which are capable of solving the problem accompanying the conventional art. The above and other subjects can be achieved by combining the features recited in independent claims. Then, dependent claims define further effective specific example of the present invention.

To solve the above-described problem, a first aspect of the present invention provides an image capturing apparatus. The image capturing apparatus includes: a focus control section for sequentially focusing a plurality of different focus distances within one image-capturing range; an image capturing section for capturing an image within an image-capturing range when the focus control section focuses on a first focus distance to acquire a first captured image, and for capturing an image in the image-capturing range when the focus control section focuses on a second focus distance to acquire a second captured image; and an image generating section for generating capturing range image information which is information on the image within the image-capturing range by combining the first captured image and the second captured image. Here, the image capturing apparatus may be an image capturing apparatus for capturing moving images. Additionally, the image capturing apparatus may further include a moving image recording section for recording plural pieces of capturing range image information generated by the image generating section as moving image data. The image generating section may generate the capturing range image information as a set of image information consisting of the first captured image and the second captured image which should be continuously reproduced. The moving image recording section may record the capturing range image information as the moving image data in order to continuously reproduce the first captured image and the second captured image.

Additionally, the image generating section may generate a composite image generated by superimposing the first captured image and the second captured image per pixel as the capturing range image information. The moving image recording section may record the capturing range image information as one frame of moving image data. The image capturing apparatus further includes a multipoint distance measurement section for measuring a distance to the subject at a plurality of distance measurement points within the image-capturing range to obtain a plurality of focus points. The focus control section may sequentially focus on the plurality of subjects with each focus distance measured by the multipoint distance measurement section. Then, the image capturing section further includes a light refractive index variable section for refracting light emitted from the image-capturing range and a light receiving section for receiving the light refracted by the light refractive index variable section and acquiring the first captured image and the second captured image. The focus control section may sequentially focus on the plurality of different focus distances by controlling the refractive index of the light refractive index variable section. Additionally, the light refractive index variable section may change the refractive index according to an applied voltage and control the voltage applied to the light refractive index variable section to control the refractive index of the light refractive index variable section.

Additionally, a second aspect of the present invention provides an image capturing method. The image capturing method includes the steps of; focusing on a first focus distance; capturing an image within an image-capturing range by an image capturing section when the first focus distance is focused in the first focusing step to acquire a first captured image; focusing on a second focus distance different from the first focus distance; capturing an image within the image-capturing range when the second focus distance is focused in the second focusing step to acquire a second captured image; and generating capturing range image information which is information on the image within the image-capturing range by combining the first captured image and the second captured image.

Additionally, a third aspect of the present invention provides an image capturing program for an image capturing apparatus for focusing on a plurality of difference focus distances to capture an image in an image-capturing range. The image capturing program operates the image capturing apparatus to function as: a focus control section for sequentially focusing a plurality of different focus distances within one image-capturing range; an image capturing section for capturing an image within an image-capturing range when the focus control section focuses on a first focus distance to acquire a first captured image, and for capturing an image in the image-capturing range when the focus control section focuses on a second focus distance to acquire a second captured image; and an image generating section for generating capturing range image information which is information on the image within the image-capturing range by combining the first captured image and the second captured image.

Additionally, a fourth aspect of the present invention provides an image recording output system. The image recording output system includes: a focus control section for sequentially focusing on a plurality of different focus distances within one image-capturing range; an image capturing section for capturing an image in an image-capturing range when the focus control section focuses on a first focus distance to acquire a first captured image, and for capturing an image in the image-capturing range when the focus control section focuses on a second focus distance to acquire a second captured image; and an image output section for superimposing the first captured image and the second captured image and outputting the same. The image output section may continuously display the first captured image and the second captured image to present the superimposed image. Additionally, the image output section may output a composite image generated by superimposing the first captured image and the second captured image per pixel.

Further, a fifth aspect of the present invention provides an image recording output method for recoding images and outputting the same. The image recording output method includes the steps of: sequentially focusing on a plurality of different focus distances within one image-capturing range; capturing an image in an image-capturing range when first focus distance is focused in the focusing step to acquire a first captured image, and for capturing an image in the image-capturing range when a second focus distance is focused in the focusing step to acquire a second captured image; and superimposing the first captured image and the second captured image and outputting the same.

Further, a sixth aspect of the present invention provides an image capturing apparatus. The image capturing apparatus includes: an image capturing section for capturing a plurality of images within one image-capturing range; an exposure control section for changing exposure every time the image capturing section captures an image; an image-capturing control section for capturing a first captured image by the image capturing section when the exposure control section sets a first exposure value, and for capturing a second captured image by the image capturing section when the exposure control section sets a second exposure value; and an image generating section for generating capturing range image information which is information on the image within the image-capturing range by combining the first captured image and the second captured image captured by the image capturing section.

Further, a seventh aspect of the present invention provides an image capturing method. The image capturing method includes the steps of: setting exposure of an image capturing section for capturing a plurality of images within one image-capturing range to a first exposure value; capturing an image in the image-capturing range with the first exposure value set in the first exposure value setting step by the image capturing section to acquire a first captured image; setting exposure of the image capturing section to a second exposure value; capturing the image-capturing range with the second exposure value set in the second exposure value setting step by the image capturing section to acquire a second captured image; and generating capturing range image information which is information on the image within the image-capturing range by combining the first captured image and the second captured image acquired by the image capturing section.

Further, an eight aspect of the present invention includes an image capturing program for an image capturing apparatus for capturing an image within an image-capturing range with the changed exposure. The image capturing program operates the image capturing apparatus to function as: an image capturing section for capturing a plurality of images within one image-capturing range; an exposure control section for changing exposure every time the image capturing section captures an image; an image-capturing control section for capturing a first captured image by the image capturing section when the exposure control section sets a first exposure value, and for capturing a second captured image by the image capturing section when the exposure control section sets a second exposure value; and an image generating section for generating capturing range image information which is information on the image within the image-capturing range by combining the first captured image and the second captured image captured by the image capturing section.

Further, a ninth aspect of the present invention provides an image capturing apparatus. The image capturing apparatus includes: a light receiving section for receiving light within an image-capturing range; a diaphragm section for adjusting the amount of light emitted to the light receiving section; a diaphragm control section for controlling the aperture amount of the diaphragm section to change the depth of field; and a captured image acquiring section for acquiring a first captured image from the light received by the light receiving section when the diaphragm control section set a first depth of field, and for acquiring a second captured image from the light received by the light receiving section when the diaphragm control section set a second depth of field. Additionally, the image capturing apparatus may further include an image generating section for generating capturing range image information on the image-capturing range by combining the first captured image and the second captured image acquired by the captured image acquiring section.

Further, a tenth aspect of the present invention provides an image capturing method. The image capturing method includes the steps of: controlling the aperture amount of a diaphragm section for adjusting the amount of light emitted to a light receiving section for receiving light within an image-capturing range to set a first depth of field; acquiring a first captured image from the light within the image-capturing range which is received by the light receiving section when the first depth of field is set in the first depth of field setting step; controlling the aperture amount of the diaphragm section to set a second depth of field different from the first depth of field; and acquiring a second captured image from the light within the image-capturing range which is received by the light receiving section when the second depth of field is set in the second depth of field setting step.

Still more, an eleventh aspect of the present invention provides an image capturing program for an image capturing apparatus for capturing an image-capturing range with the changed depth of field. The image capturing program operates the image capturing apparatus to function as: a light receiving section for receiving light within an image-capturing range; a diaphragm section for adjusting the amount of light emitted to the light receiving section; a diaphragm control section for controlling the aperture amount of the diaphragm section to change the depth of field; and a captured image acquiring section for acquiring a first captured image from the light received by the light receiving section when the diaphragm control section set a first depth of field, and for acquiring a second captured image from the light received by the light receiving section when the diaphragm control section set a second depth of field.

still more, a twelfth aspect of the present invention provides an image capturing apparatus. The image capturing apparatus includes: a light splitting section for splitting light emitted from an image-capturing range into a first light and a second light; a first light receiving section for receiving the first light; a second light receiving section for receiving the second light; a focus control section for controlling the focus distance of the first light on the first light receiving section to a first focus distance to receive the light by the first light receiving section, and for controlling the focus distance of the second light on the second light receiving section to a second focus distance different from the first focus distance to receive the light by the second light receiving section; and an captured image acquiring section for acquiring a first captured image from the first light with the first focus distance which is received by the first light receiving section, and for acquiring a second captured image from the second light with the second focus distance which is received by the second light receiving section. The image capturing apparatus may further include an image generating section for generating capturing range image information which is information on the image within the image-capturing range by combining the first captured image and the second captured image acquired by the captured image acquiring section.

Then, the image generating section may generate the image within the image-capturing range by combining the image of a region in the first captured image which is focused on the first focus distance of the first light on the first light receiving section with the image of a region in the second captured image which is focused on the second focus distance of the second light on the second light receiving section. The image capturing apparatus may further include a multipoint distance measurement section for measuring the distance from the image capturing apparatus to the subject at a plurality of distance measurement points within the image-capturing range, and a focus distance calculating section for calculating a focus distance for each of the plurality of distance measurement points based on the plurality of distances measured by the multipoint distance measurement section. The focus control section may control the focus distance of the first light on the first light receiving section to the first focus distance calculated by the focus distance calculating section to receive the first light by the first light receiving section, and control the focus distance of the second light on the second light receiving section to the second focus distance calculated by the focus distance calculating section to receive the second light by the second light receiving section.

Further, The focus control section may control the focus distance of a third light on the first light receiving section to a third focus distance different from the first focus distance and the second focus distance to receive the light by the first light receiving section, and control the focus distance of a fourth light on the second light receiving section to a fourth focus distance different from the first, second and third focus distances to receive the light by the second light receiving section. The captured image acquiring section may further acquire a third captured image from the third light with the third focus distance which is received by the first light receiving section, and further acquire a fourth captured image from the fourth light with the fourth focus distance which is received by the second light receiving section. The image generating section may generate capturing range image information which is information on the image within the image-capturing range by combining each of the first captured image, the second captured image, the third captured image and the fourth captured image acquired by the captured image acquiring section.

Additionally, the image capturing apparatus further include a multipoint distance measurement section for measuring the distance from the image capturing apparatus to the subject at a plurality of distance measurement points within the image-capturing range, and a focus distance calculating section for calculating a focus distance for each of the plurality of distance measurement points based on the plurality of distances measured by the multipoint distance measurement section. The focus control section may sequentially focus on the focus distances calculated by the focus distance calculating section and control the focus distance of the first light on the first light receiving section to the first focus distance calculated by the focus distance calculating section to receive the light by the first light receiving section while the focus control section controls the focus distance of the second light on the second light receiving section to the second focus distance calculated by the focus distance calculating section to receive the light by the second light receiving section. The focus control section may further control the focus distance of the third light on the first light receiving section to the third focus distance calculated by the focus distance calculating section to receive the light by the first light receiving section while the focus control section controls the focus distance of the fourth light on the second light receiving section to the fourth focus distance calculated by the focus distance calculating section to receive the light by the second light receiving section.

The image capturing apparatus may further include a light refractive index variable section for refracting a first light split by the light splitting section. The focus control section may control the focus distance of the first light on the first light receiving section to the first focus distance by changing the refractive index of the light refractive index variable section, and control the focus distance of the second light to the second focus distance to receive the light by the second light receiving section. The image capturing apparatus may further include a first light receiving position drive section for moving the position of the first light receiving section along the optical axis. The focus control section may cause the first light receiving position drive section to move the position of the first light receiving section along the optical axis and control the focus distance of the first light on the first light receiving section to the first focus distance to receive the light by the first light receiving section, and control the focus distance of the second light on the second light receiving section to the second focus distance to receive the light by the second light receiving section.

Still more, a thirteenth aspect of the present invention provides an image capturing method. The image capturing method includes the steps of: splitting light from an image-capturing range into a first light and a second light; controlling the focus distance of the first light on a first light receiving section for receiving the first light split by the light splitting step to a first focus distance to receive the light by the first light receiving section; acquiring a first captured image from the first light with the first focus distance controlled in the first focus controlling step; controlling the focus distance of a second light on a second light receiving section for receiving the second light to a second focus distance different from the first focus distance to receive the light by the second light receiving section; and acquiring a second captured image from the second light with the second focus distance controlled in the second focus controlling step.

Still more, a fourteenth aspect of the present invention provides an image capturing program for an image capturing apparatus for capturing an image within one image-capturing range at a plurality of different focus distances. The image capturing program operates the image capturing apparatus to function as: a light splitting section for splitting light emitted from an image-capturing range into a first light and a second light; a first light receiving section for receiving the first light; a second light receiving section for receiving the second light; a focus control section for controlling the focus distance of the first light on the first light receiving section to a first focus distance to receive the light by the first light receiving section, and for controlling the focus distance of the second light on the second light receiving section to a second focus distance different from the first focus distance to receive the light by the second light receiving section; and an captured image acquiring section for acquiring a first captured image from the first light with the first focus distance which is received by the first light receiving section, and for acquiring a second captured image from the second light with the second focus distance which is received by the second light receiving section.

Still more, a fifteenth aspect of the present invention provides an image capturing apparatus. The image capturing apparatus includes: a light receiving section for receiving light within an image-capturing range; a movement control section for moving the light receiving section to the direction approximately perpendicular to an image-capturing direction; an image-capturing control section for controlling the light receiving section to receive light within the image-capturing range while the movement control section moves the light receiving section to a first direction, and for controlling the light receiving section to receive light within the image-capturing range while the movement control section moves the light receiving section to a second direction different from the first direction after the movement control section moves the light receiving section to the first direction; and a captured image acquiring section for acquiring a first captured image from the light received by the light receiving section while the light receiving section moves to the first direction, and for acquiring a second captured image from the light received by the light receiving section while the light receiving section moves to the second direction. The image capturing apparatus may further include an image generating section for generating capturing range image information which is information on the image within the image-capturing range by combining the first captured image and the second captured image acquired by the captured image acquiring section. Additionally, the image generating section may generate the capturing range image information by comparing the amount of blurring of the subject in the first captured image and the amount of blurring of the subject in the second captured image, and combining the image of a region in the first captured image in which the amount of blurring of subject is less than that of the subject in the second captured image with the image of a region in the second captured image in which the amount of blurring of the subject is less than that of the subject in the first captured image.

Still more, a sixteenth aspect of the present invention provides an image capturing method. The image capturing method includes the steps of: moving a light receiving section for receiving light within an image-capturing range to a first direction approximately perpendicular to an image-capturing direction; controlling the light receiving section to receive the light within the image-capturing range while the light receiving section is moved to the first direction in the first moving steps; acquiring a first captured image from the light received by the light receiving section in the first controlling step; moving the light receiving section to a second direction approximately perpendicular to the image-capturing direction; controlling the light receiving section to receive the light within the image-capturing range while the right receiving section is moved to the second direction in the second moving step; and acquiring a second captured image from the light received by the light receiving section in the second controlling step.

Still more a seventeenth aspect of the present invention provides an image capturing program for an image capturing apparatus for capturing an image within an image-capturing range while a light receiving section is moved. The image capturing program operates the image capturing apparatus to function as: a light receiving section for receiving light within an image-capturing range; a movement control section for moving the light receiving section to the direction approximately perpendicular to an image-capturing direction; an image-capturing control section for controlling the light receiving section to receive light within the image-capturing range while the movement control section moves the light receiving section to a first direction, and for controlling the light receiving section to receive light within the image-capturing range while the movement control section moves the light receiving section to a second direction different from the first direction after the movement control section moves the light receiving section to the first direction; and a captured image acquiring section for acquiring a first captured image from the light received by the light receiving section while the light receiving section moves to the first direction, and for acquiring a second captured image from the light received by the light receiving section while the light receiving section moves to the second direction.

Here, all necessary features of the present invention are not listed in the summary of the invention. The sub-combinations of the features may become the invention.

According to the present invention, a moving image and a still image with the extended depth of field, which are focused on a plurality of subjects even if the image capturing apparatus captures the plurality of subjects with different focus distances each other.

BRIEF DESCRIPTION OF THE DRAWINGS

FIG. 5 shows light refraction in a light refractive index variable section 95;

DETAILED DESCRIPTION OF THE INVENTION

Hereinafter, the present invention will now be described through preferred embodiments. The embodiments do not limit the invention according to claims and all combinations of the features described in the embodiments are not necessarily essential to means for solving the problems of the invention.

Figure 1:
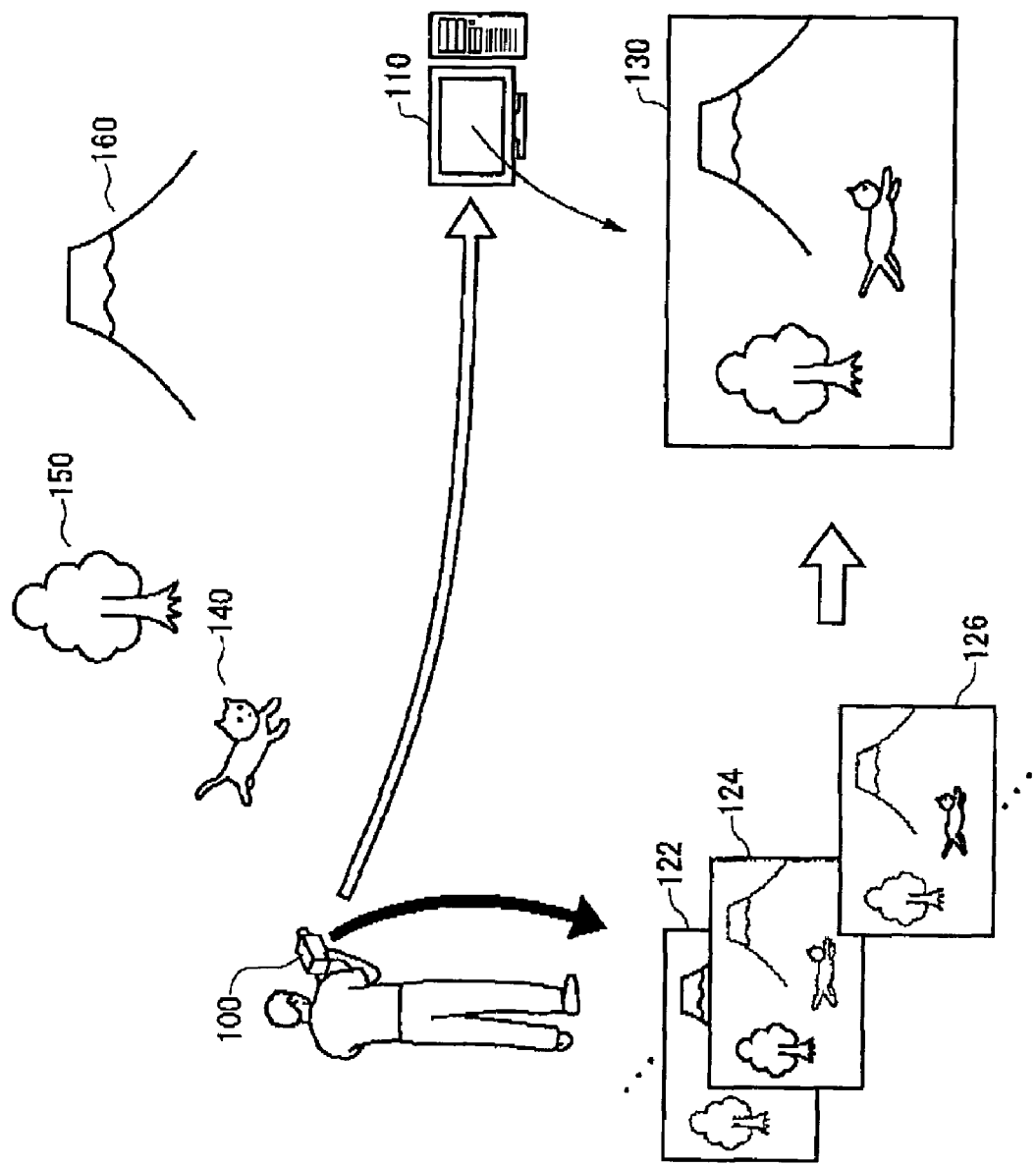
FIG. 1 is a conceptual diagram of an image recording output system.

FIG. 1 is a conceptual diagram of an image recording output system according to a first embodiment of the present invention. The image recording output system includes an image capturing apparatus 100 and an image output apparatus 110. For example, it assumes that a user captures a moving image of a running cat 140 against a background of a tree 150 and a mountain 160. In this case, the image capturing apparatus 100 sequentially focuses on the cat 140, the tree 150 and the mountain 160 with difference focus distances each other. Then, when each of the focus distance of the cat 140, the tree 150 and the mountain 160 is focused, the image capturing apparatus 100 acquires a captured image 126, a captured image 124 and a captured image 122.

Next, the image capturing apparatus 100 combines the acquired captured image 122, 124 and 126 to generate capturing range image information 130. Here, the capturing range image information means image information generated by combining a plurality of captured images which are captured with the different focuses within one image-capturing range. Additionally, the image capturing apparatus 100 records the plural pieces of generated capturing range image information as moving image data. Then, the plural pieces of capturing range image information which are recorded as the moving image data by the image capturing apparatus 100 are provided to a display device such as a monitor and displayed as moving images.

For another example, the image capturing apparatus 100 provides the captured moving images to the image output apparatus 110. The moving images captured by the image capturing apparatus 100 are provided to the image output apparatus 110 by means of a network such as Internet and a memory. Then, the image output apparatus 110 superimposes the plurality of captured images. Here, the image output apparatus 110 may generate capturing range image information from the captured images. Then, the image output apparatus 110 may display the superimposed captured images as a still image. Additionally, the image output apparatus 110 may print the superimposed captured images using a printer to produce an album. Further, the image output apparatus 110 may display the captured range image information on the monitor.

The image recording output system according to the present embodiment aims to provide a moving image and a still image in which a plurality of subjects are focused on and which have the extended depth of field by combining a plurality of images when image recording output system captures the plurality of images with the different focus distances each other.

Figure 2:
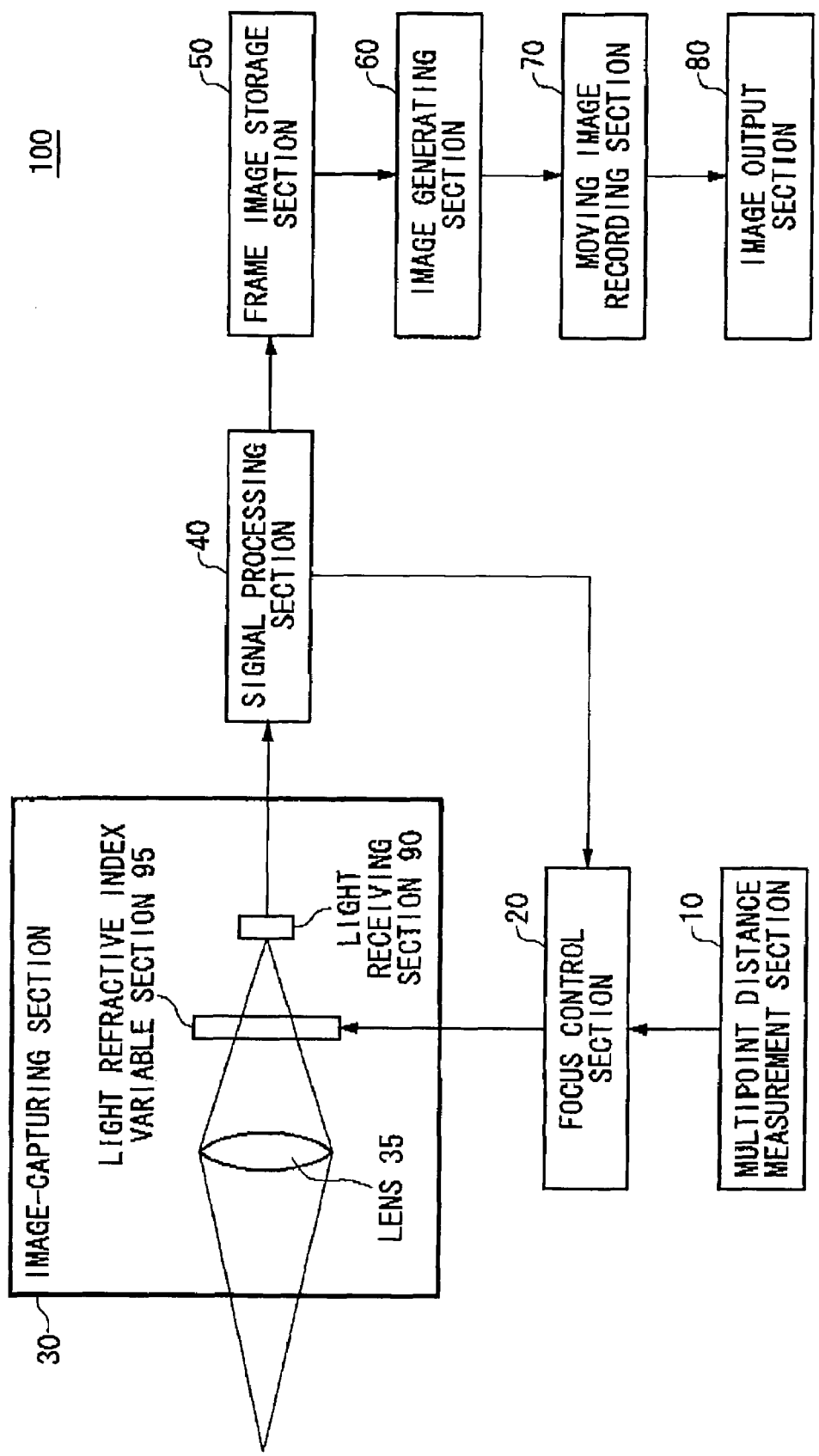
FIG. 2 is a block diagram showing the functional configuration of an image capturing apparatus 100.

FIG. 2 shows an example of the functional configuration of the image capturing apparatus 100 according to the present embodiment. The image capturing apparatus 100 includes a multipoint distance measurement section 10, a focus control section 20, an image capturing section 30, a signal processing section 40, a frame image storage section 50, an image generating section 60, a moving image recording section 70 and an image output section 80. The image capturing section 30 has a lens 35, a light receiving section 90 and a light refractive index variable section 95. Here, the image output apparatus 110 is an example of the image output section 80 according to the present embodiment.

The multipoint distance measurement section 10 measures distances to a plurality of subjects at a plurality of distance measurement points within an image-capturing range and calculates the focus distances to each of the subjects. The multipoint distance measurement section 10 provides the measured distances to the plurality of subjects and the calculated focus distances to the focus control section 20. The focus control section 20 sequentially focuses on each of the subjects with the different focus distances calculated by the multipoint distance measurement section 10.

Additionally, the focus control section 20 sequentially focuses on each of the plurality of subjects with the different focus distances by controlling the refractive index of the light refractive index variable section 95. For example, the focus control section 20 controls a voltage applied to the light refractive index variable section 95 to control the refractive index of the light refractive index variable section 95. Further, the focus control section 20 may focuses on the subjects by autofocus control to determine a focus distance by detecting the contrast of the image within the image-capturing range acquired by the light receiving section 90 without using the focus distance measured by the multipoint distance measurement section 10.

The image capturing section 30 captures an image within an image-capturing range and acquires a first captured image when the focus control section 20 focuses on a first focus distance. Then, the image capturing section 30 captures an image within the image-capturing range and acquires a second captured image when the focus control section focuses on a second focus distance. Here, the first captured image is a captured image exists within the image-capturing range and is captured by the image capturing section 30 with focusing on the focus distance of a predetermined subject. For example, the first captured image may be a captured image acquired by the image capturing section 30 with focusing on a main subject. Additionally, the second captured image is a captured image acquired by the image capturing section 30 with focusing the focus distance of the subject different from the subject for the first captured image. Here, the captured images acquired by the image capturing section 30 are not limited to the first captured image and the second captured image. When there are two or more subjects, images are captured with focusing on the focus distances for each of the plurality of subjects and then, the image capturing section 30 may acquire a plurality of captured images.

The light refractive index variable section 95 refracts light entered through the lens 35 in order that the light from a subject is focused on the light receiving section 90. Then, the light receiving section 90 receives light refracted through the light refractive index variable section 95 and acquires the first captured image and the second captured image. Then, the light receiving section 90 provides the acquired captured image to the signal processing section 40.

The signal processing section 40 performs an image processing such as a white balance correction processing and a gamma correction processing on the captured images acquired by the light receiving section 90. Then, the signal processing section 40 provides images such as the first captured image and the second captured image to the frame image storage section 50. The frame image storage section 50 stores a plurality of images such as the first captured image and the second captured image. The frame image storage section 50 provides the plurality of images such as the first captured image and the second captured image to the image generating section 60.

The image generating section 60 combines the first captured image and the second captured image to generate capturing range image information. Then, the image generating section 60 provides the generated capturing range image information to the moving image recording section 70. The moving image recording section 70 records plural pieces of capturing range image information generated by the image generating section 60 as moving image data. The image output section 80 receives the moving image data recorded by the moving image recording section 70 and displays as a moving image the capturing range image information recorded as the moving image data on a display device such as a monitor. Additionally, the image output apparatus 100 being an example of the image output section 80 may superimpose the first captured image and the second captured image to output the image generated by the image generating section as a still image.

The image output recording system according to the present embodiment can acquire the captured image with focusing on a plurality of subjects having the different focus distances each other. Then, the image recording output system can generate moving image data with an extended depth of field by combining the captured images. Additionally, the image recording output system may generate a still image with an extended depth of field by superimposing the acquired captured images. Therefore, the user can automatically view the moving image or the still image with focusing on a plurality of subjects.

Figure 3:
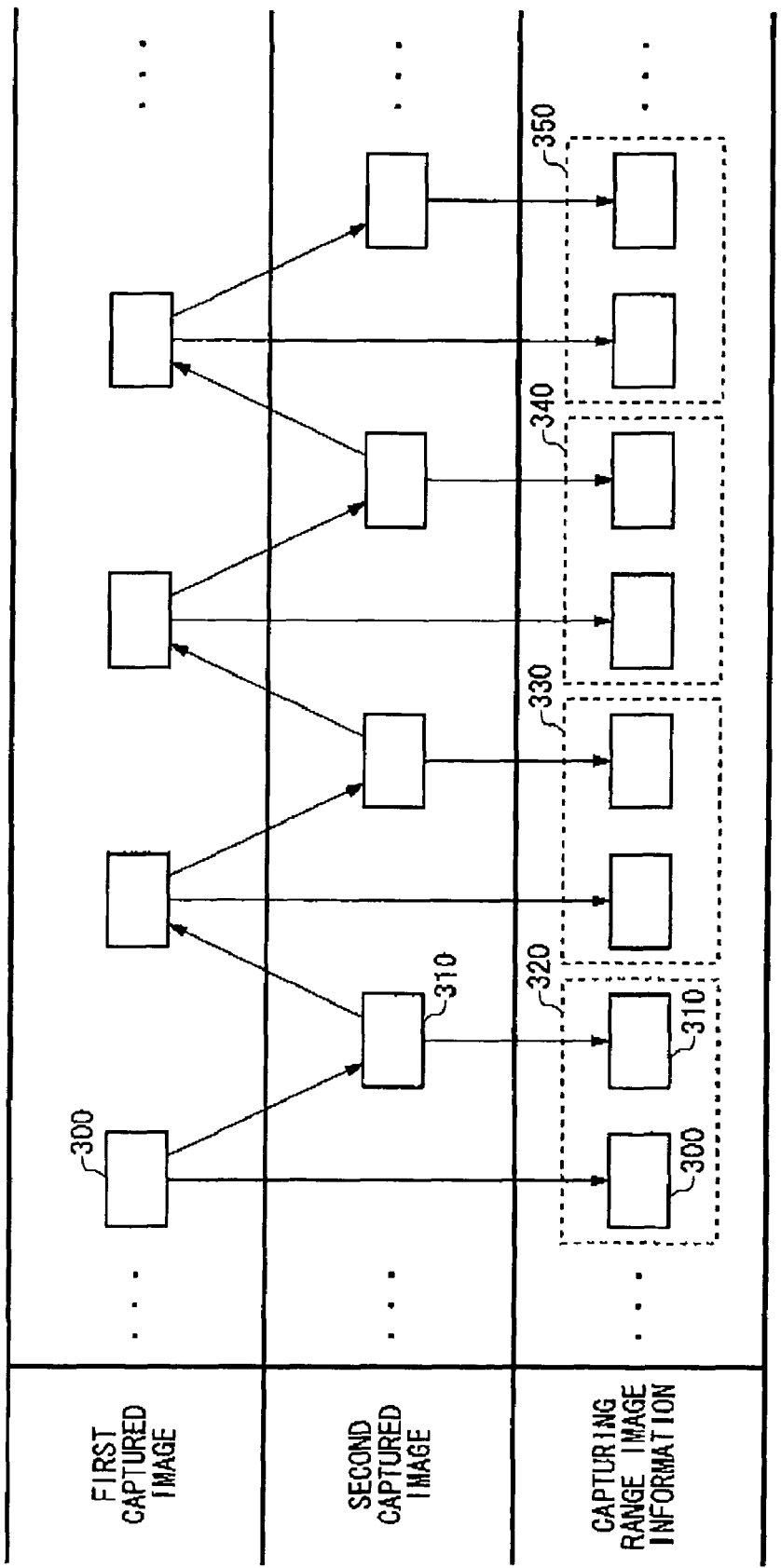
FIG. 3 shows a process of generating capturing range image information by an image generating section 60.

FIG. 3 shows an example of the process of generating capturing range image information by an image generating section 60. The image generating section 60 generates capturing range image information as a set of image information including a first captured image and a second captured image which should be continuously reproduced. For example, a captured image 300 being the first captured image and a captured image 310 being the second captured image are a set of capturing range image information 320. Here, a time interval between the first captured image and the second captured image may be determined based on the frame period.

Then, the image generating section 60 generates plural pieces of capturing range image information, such as capturing range image information 330, capturing range image information 340 and capturing range image information 350 by paring each of two captured images as described above. Here, capturing range image information is generated by paring two captured images, however, the captured images are not limited to two but the capturing range image information may be generated by a plurality of captured images.

Then, the image generating section 60 provides the generated plural pieces of capturing range image information 330-350 to the moving image recording section 70. Then, the image output apparatus 110 sequentially reproduces the generated plural pieces of capturing range image information 330-350 on a monitor. Additionally, for another example, the image recording output system superimposes the first captured image and the second captured image by sequentially displaying the same to display as a still image. For example, the captured image 300 and the capture image 310 are continuously displayed in turn to display the same as a still image on a monitor.

Figure 4:
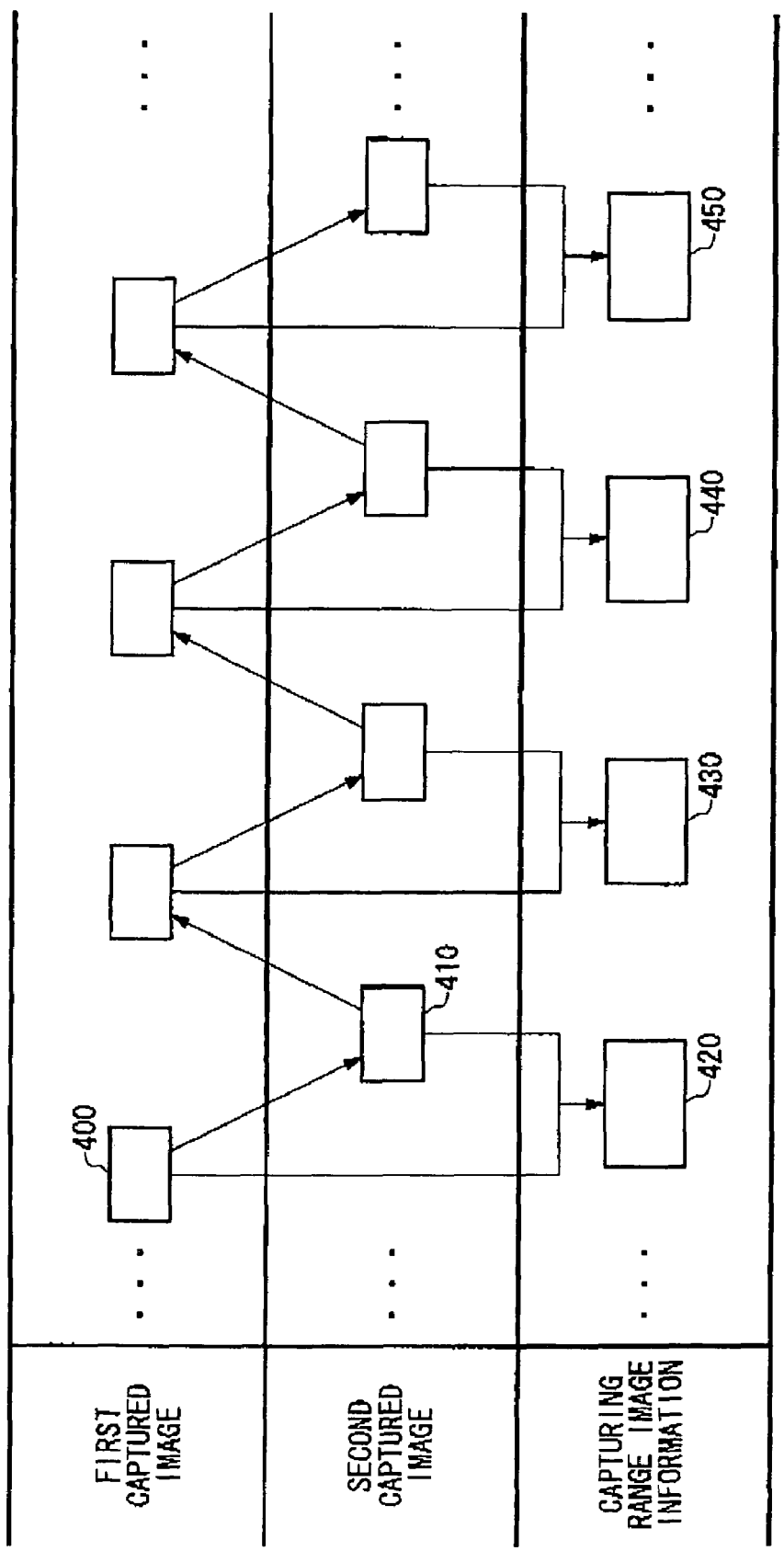
FIG. 4 shows a process of generating capturing range image information by an image generating section 60.

FIG. 4 shows an example of the process of generating capturing range image information by an image generating section 60. The image generating section 60 superimposes the first captured image and the second captured image per pixel to generate a composite image as capturing range image information. For example, a captured image 400 being the first captured image and a captured image 410 being the second captured image are superimposed per pixel to generate a composite image. Then, the image generating section 60 generates plural pieces of capturing range image information such as a composite image 430, a composite image 440 and a composite image 450 by superimposing each of two captured images per pixel as described above.

Here, one composite image as capturing range image information is generated by two captured images in the above description, however, captured images to be combined are not limited to two. The image generating section 60 may generate capturing range image information using two or more captured images. For example, when the image capturing section 30 captures a plurality of images with focusing on a plurality of subjects, the image generating section 60 generates capturing range image information using the images captured by the image capturing section 30 for each of the plurality of subjects. Then, the image generating section 60 provides the generated plural pieces of capturing range image information to the moving image recording section 70. The moving image recording section 70 records the capturing range image information generated by the image generating section 60 as one frame of moving image data. Then, the image capturing apparatus 100 sequentially outputs a plurality of one frame of moving image data to a monitor to reproduce a moving image.

Additionally, for another example, the image recording output system superimposes the first captured image and the second captured image per pixel to generate a still image. Then, the image output section 80 outputs the generated still image. For example, the still image can be displayed on a monitor, or printed by a printer.

The image recording output system according to the present invention can make the plurality of captured images be a set of capturing range image information which should be continuously reproduced. Additionally, the image recording output system can generates capturing range image information as one frame of image data by superimposing the plurality of captured images per pixel. Therefore, the image recording output system can automatically generate a moving image and a still image in which a plurality of subjects with the different focus distances are focused and which have the extended depth of field.

FIG. 5 shows an example of light refraction in the light refractive index variable section 95. The light refractive index variable section 95 refracts light from subjects within an image-capturing range. The focus control section 20 controls the refractive index of the light refractive index variable section 95 by applying voltage to the light refractive index variable section 95. For example, the focus control section 20 controls the refractive index of the light refractive index variable section 95 to control the refraction of light from a subject 510 and a subject 512. Therefore, the focus control section 20 can adjust the focus of light from the subject 510 and the subject 512 to the light receiving section 90 regardless of the position of the subject 510 and the subject 512.

The light refractive index variable section 95 is a solid, liquid and the other fluid, and is formed of a material of which light refractive index is changed by applying voltage. For example, electro-optic crystal such as LiNbO3, LiTaO3 and BaTiO3 indicative of Pockels effect, and PLZT and KTN indicative of Kerr effect can be used. Additionally, liquid crystal material of which refraction of light is changed by applying voltage may be used. Further, the focus control section 20 may control the refraction of light from the subject by operating the lens 35 toward the subject side or the light receiving section 90 side along with by controlling the refractive index of the light refractive index variable section 95.

The image recording output system according to the present invention can adjust the focus of light from the subject to the light receiving section 90 by controlling the refractive index of the light refractive index variable section 95. Thereby it is possible to quickly focus on the subject in comparison with that the lens is mechanically operated to focus on the subject. Accordingly, the image recording output system can easily provide to the user a moving image in which each of the plurality of subjects included in the image-capturing range are focused and which has an extended depth of field.

Figure 6:
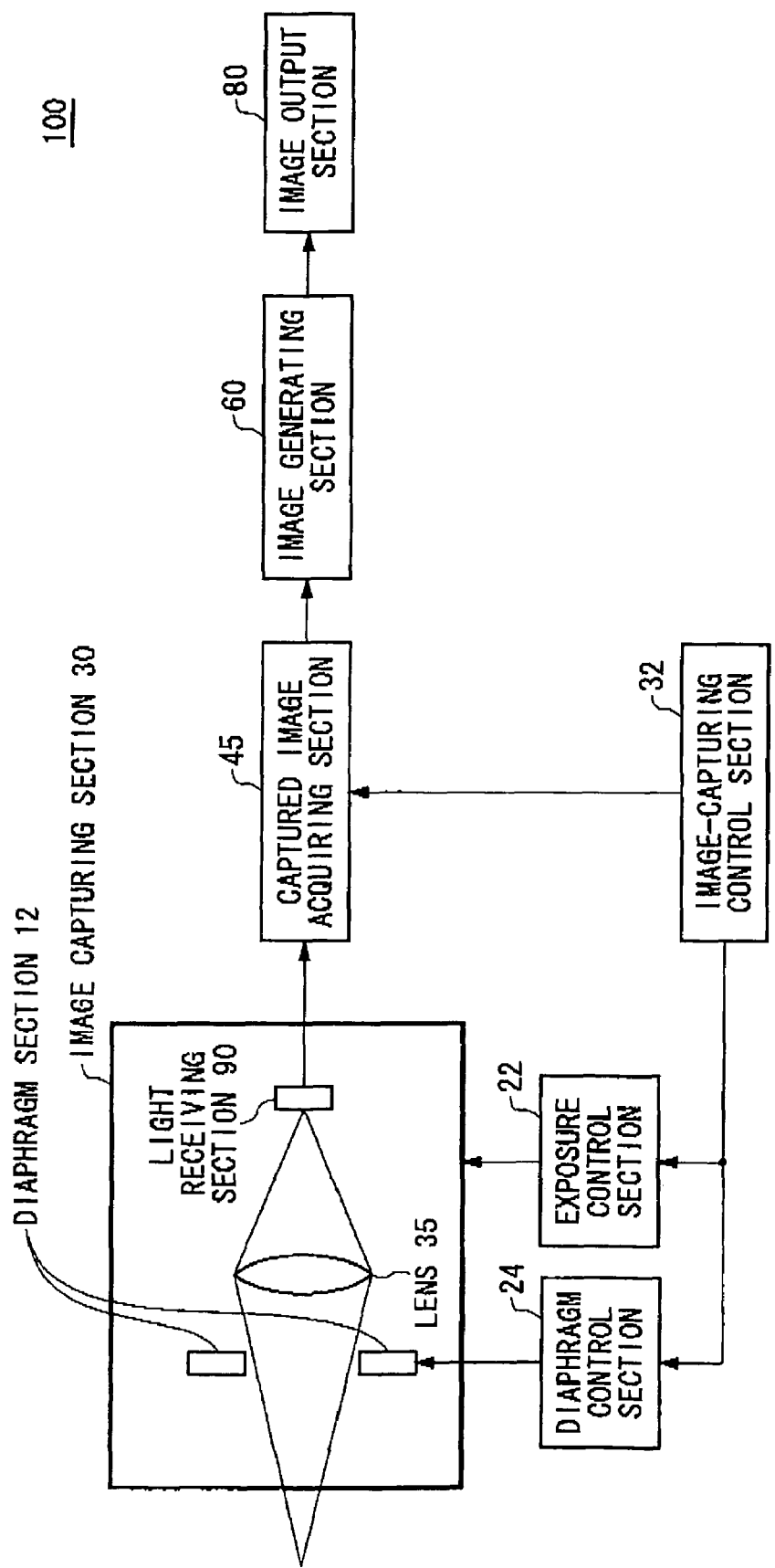
FIG. 6 shows a block diagram showing the functional configuration of an image capturing apparatus 100.

FIG. 6 shows an example of the functional configuration of the image capturing apparatus 100 according to another embodiment. The image capturing apparatus 100 according to the present embodiment includes an exposure control section 22, a diaphragm control section 24, an image capturing section 30, an image-capturing control section 32, a captured image acquiring section 60 and an image output section 80. The image capturing section 30 has a diaphragm section 12, a lens 35 and a light receiving section 90. Here, the image capturing apparatus 100 according to the present embodiment may further include a part of or all of the configurations and the functions of the image capturing apparatus 100 which has been described above with reference to FIG. 1-FIG. 5.

The image capturing section 30 captures a plurality of images within one image-capturing range. Specifically, the image capturing section 30 causes the light receiving section 90 to receive light within the image-capturing range through the lens 35. The diaphragm section 12 adjusts the amount of light within the image-capturing range which is emitted to the light receiving section 90 based on the control by the diaphragm control section 24. Then, the light receiving section 90 may receive light within the image-capturing range in which the amount of light is adjusted by the diaphragm section 12. The exposure control section 22 changes exposure every time the image capturing section 30 captures an image. Specifically, the exposure control section 22 controls a shutter speed and the aperture amount of the diaphragm of the image capturing section 30 based on the control by the image-capturing control section 32 to change exposure. Then, the light receiving section 90 receives light within the image-capturing range when the exposure control section 22 sets a predetermined exposure value. The diaphragm control section 24 controls the aperture amount of the diaphragm section 12 based on the control by the image-capturing control section 32 to change the depth of field.

The image-capturing control section 32 causes the image capturing section 30 to capture a first captured image when the exposure control section 22 sets a first exposure value. Then, the image-capturing control section 32 causes the image capturing section 30 to capture a second captured image when the exposure control section 22 sets a second exposure value different from the first exposure value. Specifically, the image-capturing control section 32 controls the exposure control section 22 to set a plurality of different exposure values. Then, the image-capturing control section 32 causes the light receiving section 90 to receive light for each of the plurality of different exposure values from one image-capturing range. Then, the image-capturing control section 32 causes the captured image acquiring section 45 to acquire a plurality of captured images for each of the plurality of exposure values in the one image-capturing range from light received by the light receiving section 90.

Additionally, the image-capturing control section 32 may cause the image capturing section 30 to capture the first captured image when the diaphragm control section 24 sets a first depth of field. Then, the image-capturing control section 32 may cause the image capturing section 30 to capture the second captured image when the diaphragm control section 24 set a second depth of field different from the first depth of field. Specifically, the image-capturing control section 32 controls the diaphragm control section 24 to set a plurality of different depth of fields. Then, the image-capturing control section 32 causes the light receiving section 90 to receive light from one image-capturing range for each of the plurality of different depth of fields. Next, the image-capturing control section 32 causes the captured image acquiring section 45 to acquire a plurality of images for each of the plurality of different depth of fields within one image-capturing range from light received by the light receiving section 90. The captured image acquiring section 45 provides the acquired captured images to the image generating section 60.

The image generating section 60 generates capturing range image information which is information on the image within the image-capturing range by combining each of the plurality of images captured by the image capturing section 30. Specifically, the image generating section 60 may generate a composite image with a wide dynamic range by combining each of the plurality of captured images when the captured image acquiring section 45 acquires the plurality of images for each of the plurality of different exposure values within one image-capturing range. Additionally, the image generating section 60 may extract the image in a part of the captured image indicative of a predetermined brightness from the plurality of images captured with the different amount of light, respectively and combines the plurality of extracted part images to generates a composite image. Therefore, the image generating section 60 can generate a composite image in which each of subjects can be approximately identified even if the subjects exist in each of the bright portion and the dark portion in the image-capturing range.

Additionally, when the captured image acquiring section 45 acquires a plurality of captured images at each of the plurality of different depth of fields within one image-capturing range, the image generating section 60 generates a composite image by combining each of the plurality of captured images. For example, the image generating section 60 can generate a composite image in which only the specified subject is focused, and a composite image in which only the specified subject is blurred by combining each of the captured images acquired by the captured image acquiring section 45 at each of the plurality of different depth of fields. The image generating section 60 provides the generated capturing range image information to the image output section 80. The image output section 80 displays the capturing range image information received from the image generating section 60 on a display device such as a monitor. Additionally, the image output section 80 may print the images on medium such as papers.

The image capturing apparatus 100 according to the present embodiment can capture a plurality of images with a plurality of different exposure values within one image-capturing range to generates a composite image by the plurality of captured images. Therefore, the user can view the composite image with a wide dynamic range. Additionally, the image capturing apparatus 100 according to the present embodiment can capture a plurality of images with a plurality of different depth of fields within one image-capturing range to generate a composite image by the plurality of captured images. Therefore, the composite image in which only the specified portion is blurred except for the region to which the user pays attention, such as the region on which the main subject exists can be easily generated.

Figure 7:
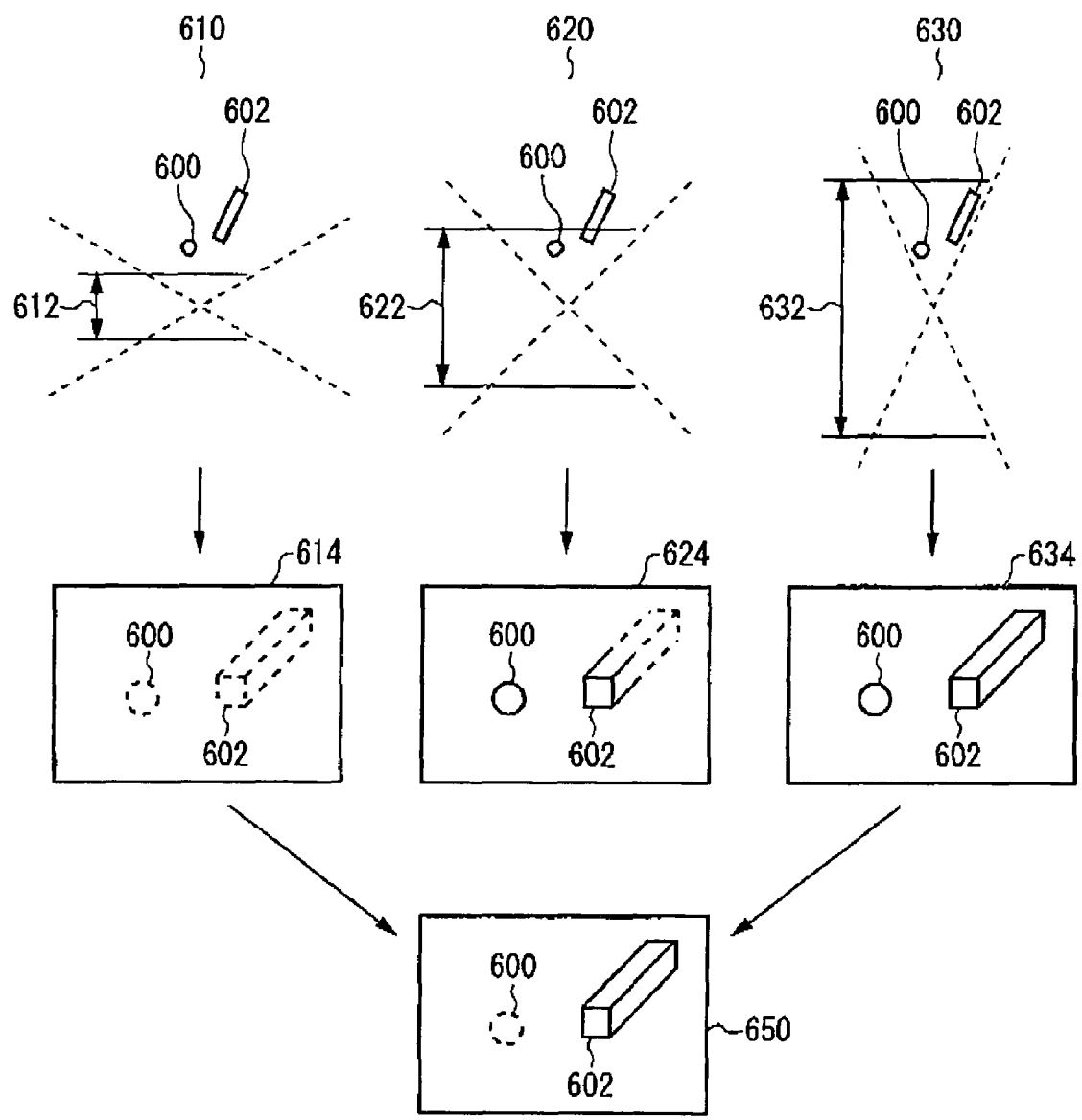
FIG. 7 shows a process of generating capturing range image information by the image generating section 60.

FIG. 7 shows an example of the process of generating capturing range image information by the image generating section 60 according to the present embodiment. Each of a schematic picture 610, a schematic picture 620 and a schematic picture 630 schematically indicates the relationship between the region at which the subject is focused in the image-capturing range and the depth of field. Firstly, the image-capturing control section 32 controls the diaphragm control section 24 responsive to the image-capturing operation by the user to set a plurality of different depth of fields. For example, the image-capturing control section 32 controls the diaphragm control section 24 responsive to one image-capturing operation by the user to set a plurality of different depth of fields. Next, the image-capturing control section 32 causes the captured image acquiring section 45 to acquire captured images for each of the plurality of depth of fields within one image-capturing range. For example, the captured image acquiring section 45 acquires a captured image 614, a captured image 624 and a captured image 634 for each of the plurality of different depth of field 612, 622 and 632, respectively.

For example with reference to the schematic picture 610, there is neither of a subject 600 and a subject 602 within the depth of field 612. Therefore, both of the subject 600 and the subject 602 are blurred in the captured image 614. Next, with reference to the schematic picture 620, the subject 600 and a part of the subject 602 included within the depth of field 622 are focused. Accordingly, the captured image acquiring section 45 acquires the captured image 624 in which a part of the subject 602 which is not included in the depth of field 622 is blurred. Next, with reference to the schematic picture 630, the whole of the subject 600 and the subject 602 are included in the depth of field 632. In this case, the captured image acquiring section 45 acquires the captured image 634 in which both of the subject 600 and the subject 602 are focused.

Then, the image generating section 60 generates a composite image by the captured image 614, the captured image 624 and the captured image 634 which are acquired by the captured image acquiring section 45. For example, the user desires to obtain an image in which the subject 600 is not focused but the whole of the subject 602 is focused, the image generating section 60 combines the image of the subject 600 in the captured image 614 and the image of the subject 602 in the captured image 634 to generate a composite image 650. Thereby the image generating section 60 can generate the composite image 650 in which the subject 600 is blurred and the subject 602 is focused. Additionally, when the user desires to obtain an image in which the subject 600 is focused but the subject 602 is not focused, the image generating section 60 combines the image of the subject 600 in the captured image 624 or the image of the subject 600 in the captured image 634 with the image of the subject 602 in the captured image 614 to generate a composite image.

The image capturing apparatus 100 according to the present embodiment can automatically capture images within the image-capturing range to generate a composite image when a plurality of different depth of fields are automatically set within one image-capturing range. Therefore, a composite image in which only the subject desired to be included in the captured image by user is focused can be easily generated without setting a complicated image capturing condition for the image capturing apparatus 100 by the user.

Figure 8:
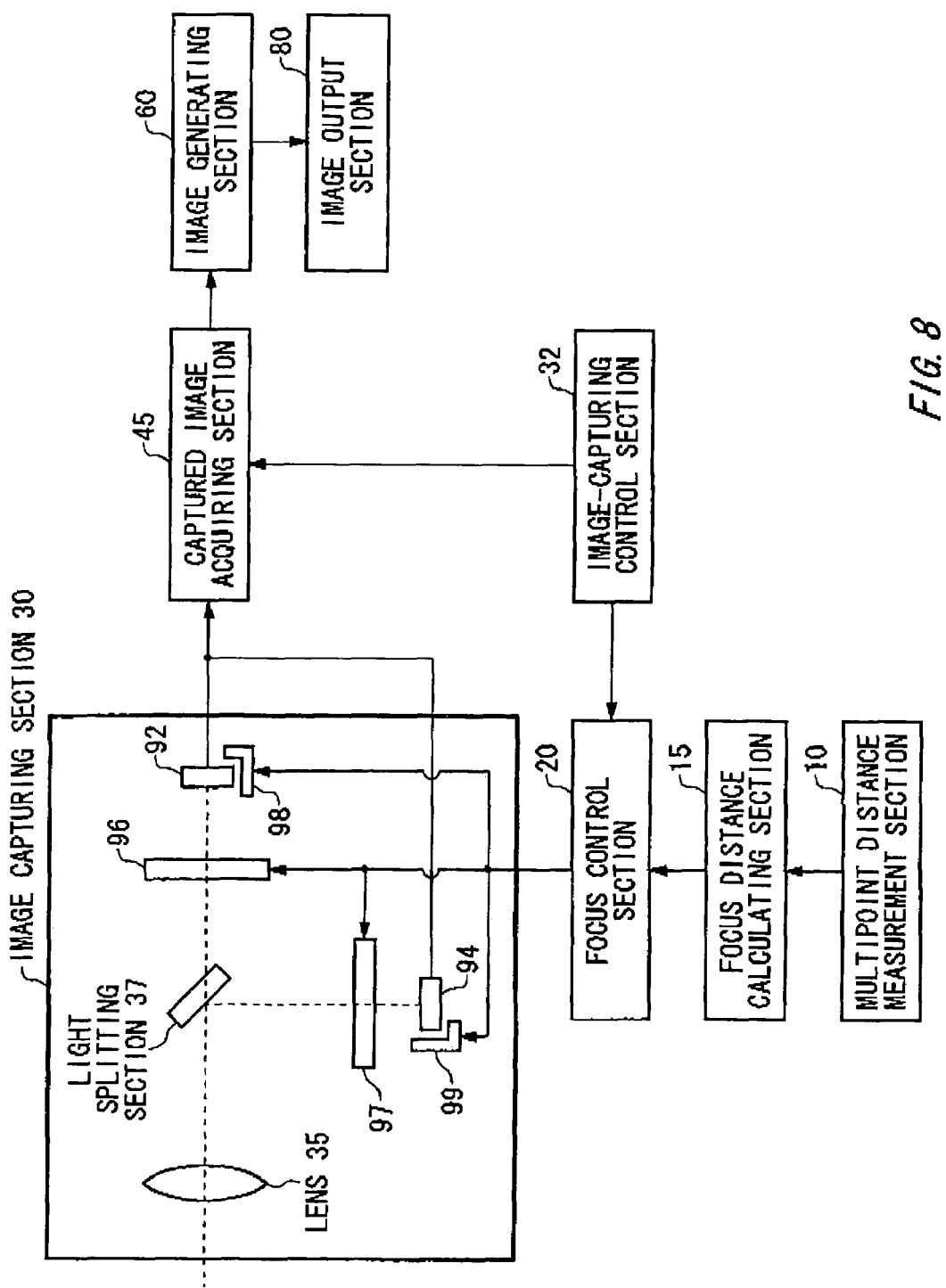
FIG. 8 shows a block diagram showing the functional configuration of an image capturing apparatus 100.

FIG. 8 shows an example of the functional configuration of the image capturing apparatus 100 according to the present embodiment. The image capturing apparatus 100 according to the present embodiment includes a multipoint distance measurement section 10, a focus distance calculating section 15, a focus control section 20, an image capturing section 30, an image-capturing control section 32, a captured image acquiring section 45, an image generating section 60 and an image output section 80. The image capturing section 30 has a lens 35, a light splitting section 37, a first light receiving section 92, a second light receiving section 94, a first light refractive index variable section 96, a second light refractive index variable section 97, a first light receiving position drive section 98 and a second light receiving position drive section 99. Here, the image capturing section 30 may have at least one of the first light refractive index variable section 96, the second light refractive index variable section 97, the first light receiving position drive section 98 and the second light receiving position drive section 99. Additionally, the image capturing apparatus according to the present embodiment may further include a part of or all of the configurations and the functions which has been described above with reference to FIG. 1-FIG. 7.

The light splitting section 37 splits light from an image-capturing range which is incident on the image capturing apparatus 30 through the lens 35 into a plurality of different lights. For example, the light splitting section 37 splits light from the image-capturing range into a first light and a second light. Here, when the image capturing section 30 has two or more light receiving sections, the light splitting section 37 splits light from the image-capturing range into one light and the other lights. Then, the light splitting section 37 may emit each of the split lights including one light and the other light to each of two or more light receiving sections. The first light refractive index variable section 96 refracts the first light split by the light splitting section 37 based on the control by the focus control section 20. The second light refractive index variable section 97 refracts the second light split by the light splitting section 37 based on the control by the focus control section 20. The first light refractive index variable section 96 and the second light refractive index variable section 97 may be a solid, liquid and the other fluid, and may be formed of a material of which the refractive index of light is changed by applying voltage. Here, the image capturing section 30 may have any one of the first light refractive index variable section 96 and the second light refractive index variable section 97. Further the image capturing section 30 may have a plurality of light refractive index variable sections according to the number of light receiving sections when it has a plurality of light receiving sections.

The first light receiving section 92 receives the first light split by the light splitting section 37. The second light receiving section 94 receives the second light split by the light splitting section 37. Here, when the image capturing section 30 has a plurality of light receiving sections, the plurality of light receiving sections receive each of the plurality of lights split by the light splitting section 37, respectively. The first light receiving position drive section 98 moves the position of the first light receiving section 92 along the optical axis based on the control by the focus control section 20. The second light receiving position drive section 99 moves the position of the second light receiving section 94 along the optical axis based on the control of the focus control section 20. The first light receiving position drive section 98 and the second light receiving position drive section 99 may be actuators which are driven by voltage. The image capturing section 30 may have any one of the first light receiving position drive section 98 or the second light receiving position drive section 99. Additionally, when the image capturing section 30 has a plurality of light receiving position drive sections, each of the plurality of light receiving sections has a light receiving position drive section. Each of the first light receiving position drive section 98 and the second light receiving position drive section 99 moves the first light receiving position 92 and the second light receiving section 94 along the optical axis, respectively, so that the focus distance for each of the first light receiving section 92 and the second light receiving section 94 is adjusted. The multipoint distance measurement section 10 measures the distance from the image capturing apparatus 100 to the subject at a plurality of distance measurement points within the image-capturing range. Then, the multipoint distance measurement section 10 provides the measurement result to the focus distance calculating section 15. Here, the image capturing apparatus 100 may use autofocus control to measure the distance from the image capturing apparatus 100 to the subject at the plurality of distance measurement points within the image-capturing range. The focus distance calculating section 15 calculates a focus distance for each of the plurality of distance measurement points from the measurement result received from the multipoint distance measurement section 10. Then, the focus distance calculating section 15 provides the focus distance for each of the plurality of calculated measurement distance points to the focus control section 20.

The focus control section 20 controls the focus distance of a first light on the first light receiving section 92 to a first focus distance and causes the first light receiving section to receive the light. Then, the focus control section 20 controls the focus distance of a second light on the second light receiving section to a second focus distance different from the first focus distance and causes the second light receiving section to receive the light. Specifically, the focus control section 20 controls the focus distance of the first light on the first light receiving section 92 to the first focus distance by changing the refractive index of the first light refractive index variable section 96 and causes the first light receiving section to receive the light. Then, the focus control section 20 controls the focus distance of the second light on the second light receiving section 94 to the second focus distance by changing the refractive index of the second light refractive index variable section 97 and causes the second light receiving section to receive the light. Additionally, the focus control section 20 may cause the first light receiving position drive section 98 to move the position of the first light receiving section 92 along the optical axis, control the focus distance of the first light on the first light receiving section 92 to the first focus distance and cause the first light receiving section 92 to receive the light. Then, the focus control section 20 may cause the second light receiving position drive section 99 to move the position of the second light receiving section 94 along the optical axis, control the focus distance of the second light on the second light receiving section 94 to the second focus distance and cause the second light receiving section 94 to receive the light.

Additionally, the focus control section 20 may control the focus distance of a third light on the first light receiving section 92 to a third focus distance different from the first focus distance and the second focus distance and cause the first light receiving section 92 to receive the light Then, the focus control section 20 control the focus distance of a fourth light on the second light receiving section 94 to a fourth focus distance different from the first focus distance, the second focus distance and the third focus distance and cause the second light receiving section to receive the light. That is to say, the focus control section 20 may sequentially change the focus distance of the light on the first light receiving section 92 and cause the first light receiving section 92 to receive the light while the focus control section 20 sequentially change the focus distance of the light on the second light receiving section 94 to the focus distance different from the focus distance of the light on the first light receiving section 92 and cause the second light receiving section 94 to receive the light.

Further, the focus control section 20 may control each of the focus distances of the light on the first light receiving section 92 and the second light receiving section 94 to the focus distance for each of the plurality of distance measurement points received from the focus distance calculating section 15, and cause the first light receiving section 92 and the second light receiving section to receive the light, respectively. Additionally, focus control section 20 may control each of the focus distances of the light on the first light receiving section 92 and the second light receiving section 94 to the focus distance calculated by the focus distance calculating section 15 with sequentially focusing on the focus distance for each of the plurality of distance measurement points received from the focus distance calculating section 15, and cause the first light receiving section 92 and the second light receiving section 94 to receive the light, respectively. That is to say, the focus control section 20 may control the focus distance of the light on the first light receiving section 92 and the second light receiving section 94 to the plurality of focus distances calculated by the focus distance calculating section 15, respectively, and cause the first light receiving section 92 and the second light receiving section 94 to receive the light. The captured image acquiring section 45 acquires a first captured image from the first light with the first focus distance which is received by the first light receiving section 92. Additionally, the captured image acquiring section 45 acquires a second captured image from the second light with the second focus distance which is received by the second light receiving section 94. When the first light receiving section 92 receives a plurality of lights with the different focus distances each other, the captured image acquiring section 45 may acquire a plurality of captured images from each of the plurality of lights with the different focus distances each other. Additionally, when the second light receiving section 94 receives a plurality of lights with the different focus distances each other, the captured image acquiring section 45 may acquire a plurality of captured images from each of the lights with the different focus distances each other. Then, the captured image acquiring section 45 provides the acquired captured images to the image generating section 60.

The image generating section 60 generates capturing range image information which is information on the image within the image-capturing range by combining the first captured image and the second captured image which are acquired by the captured image acquiring section 45. Additionally, the image generating section 60 may generate the capturing range image information by combining each of the plurality of captured images acquired by the captured image acquiring section 45. For example, the image generating section 60 extracts the image in the first captured image which is focused on the focus distance of the first light on the first light receiving section 92 by analyzing the spatial frequency component of the first captured image. Additionally, the image generating section 60 extracts the image in the second captured image which is focused on the focus distance of the second light on the second light receiving section 94 by analyzing the spatial frequency component of the second captured image. Then, the image generating section 60 may generate the image focused on the whole of the image-capturing range by combining the image extracted from the first captured image and the image extracted from the second captured image. Here, the image generating section 60 may generate an image in which the whole of the regions within image-capturing range are blurred by extracting the blurred images from each of the first captured image and the second captured image. Then, the image generating section 60 provides the generated images to the image output section 80. The image output section 80 displays the capturing range image information received from the image generating section 60 on a display device such as a monitor. Additionally, the image output section 80 may print the images on medium such as papers using the capturing range image information.

The image capturing apparatus 100 according to the present embodiment can acquire captured images with focusing on a plurality of subjects having the different focus distances each other. Then, the image capturing apparatus 100 can generate the image with an extended depth of field by combining the acquired captured images. Additionally, the image capturing apparatus 100 may generate the image with an extended depth of field by superimposing the acquired captured images. Therefore, the user can automatically view the image with focusing on a plurality of subjects.

Figure 9:
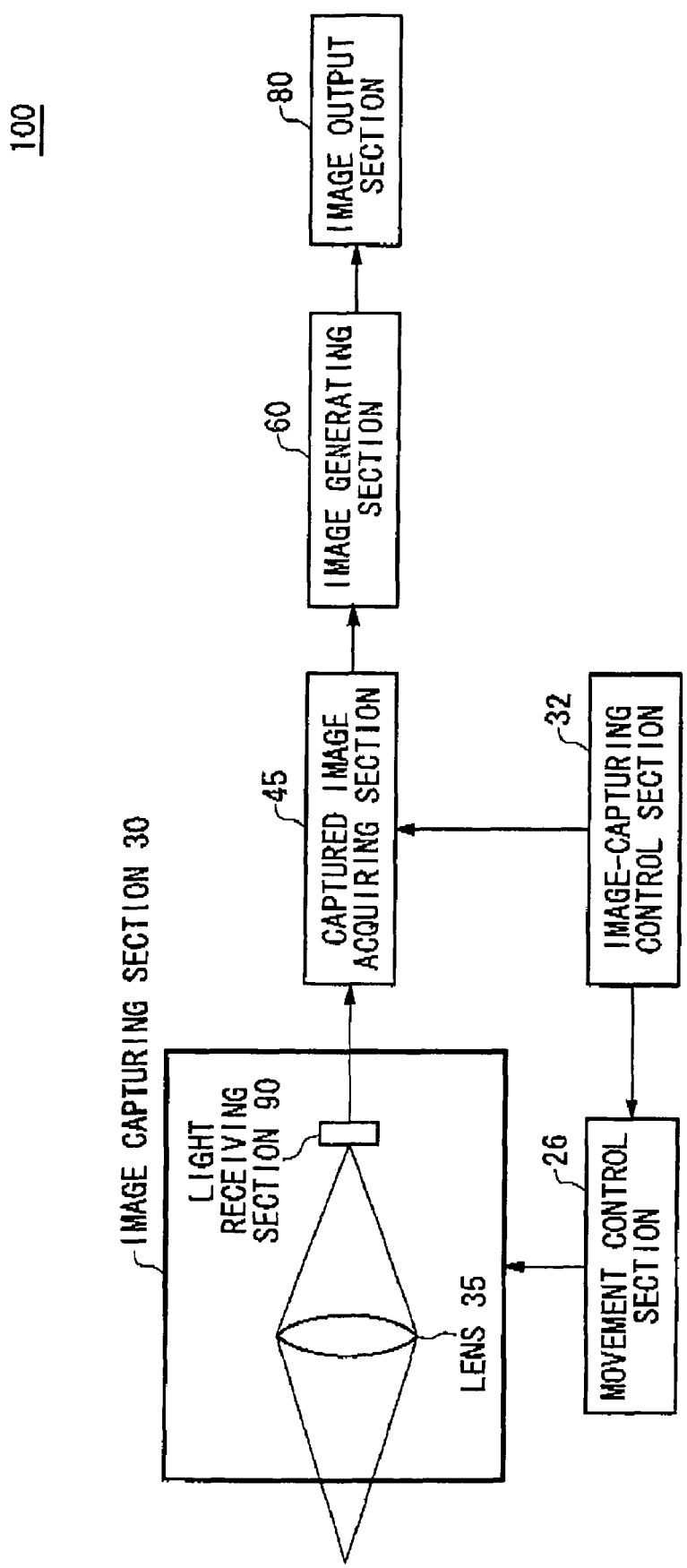
FIG. 9 shows a block diagram showing the functional configuration of an image capturing apparatus 100.

FIG. 9 shows an example of the functional configuration of the image capturing apparatus 100 according to the present embodiment. The image capturing apparatus 100 includes a movement control section 26, an image capturing section 30, an image-capturing control section 32, a captured image acquiring section 45, an image generating section 60 and an image output section 80. The image capturing section 30 has a lens 35 and a light receiving section 90. Here, the image capturing apparatus 100 may include a part of or all of the configurations and functions of the image capturing apparatus 100 which has been described above with reference to FIG. 1-FIG. 8.

The light receiving section 90 receives light within an image-capturing range through the lens 35. The movement control section 26 moves the light receiving section 90 to a direction approximately perpendicular to the image-capturing direction based on the control by the image-capturing control section 32. Specifically, the movement control section 26 may move the image capturing section 30 having the light receiving section 90 to the direction approximately perpendicular to the image-capturing direction based on the control by the image-capturing control section 32. For example, the movement control section 26 may move the image capturing section 30 using an actuator driven by voltage. Here, the movement control section 26 may move the image capturing section 30 to a plurality of directions approximately perpendicular to the image-capturing direction. The image-capturing control section 32 causes the light receiving section 90 to receive the light within the image-capturing range while the movement control section 26 moves the light receiving section 90 to a first direction. Then, after the movement control section 26 moves the light receiving section 90 to the first direction, the image-capturing control section 32 causes the light receiving section 90 to receive the light within the image-capturing range while the movement control section 26 moves the light receiving section 90 to a second direction different from the first direction. Additionally, when the movement control section 26 moves the image capturing section 30 to the plurality of directions approximately perpendicular to the image-capturing direction, the image-capturing control section 32 may cause the light receiving section 90 to receive the light within the image-capturing range while the movement control section 26 moves the image capturing section 30 to each of the plurality of directions, respectively.

Additionally, the image-capturing control section 32 may cause the light receiving section 90 to receive the light within the image-capturing range when the movement control section 26 moves the light receiving section 90 to a predetermined direction. Specifically, the image-capturing control section 32 may cause the light receiving section 90 to receive the light within the image-capturing range while the movement control section 26 moves the light receiving section 90 to the direction to which it is expected that the subject included in the image-capturing range moves in the image-capturing range. For example, the image-capturing apparatus 100 may further include a subject movement estimation section for calculating the moving direction of the subject included in the image-capturing range from a plurality of images within the image-capturing range acquired by the captured image acquiring section 45 based on the control of the image-capturing control section 32 to estimate the movement of the subject. For example, the subject movement estimation section may estimate the movement of the subject based on the difference between the plurality of captured images. Then the movement control section 26 may move the light receiving section 90 to the moving direction of the subject which is estimated by the subject movement estimation section.

Additionally, the image-capturing control section 32 may cause the movement control section 26 to move the light receiving section 90 based on a predetermined mode. For example, when the user captures images of the subject in the athletic festival, the movement control section 26 may have a mode in which the light receiving section 90 moves to the lateral direction because the subject moves to the lateral direction often times. Meanwhile when some actions such as the launch of a rocket and the climbing a tree by an animal are photographed, the movement control section 26 may have a mode in which the light receiving section 90 moves to the longitudinal direction because the subject moves to the longitudinal direction often times. Further, the movement control section 26 may have a mode in which the light receiving section 90 moves in all directions, and a mode in which the light receiving section 90 moves to a predetermined direction at plural speeds plural times.

Here, the mode in which the movement control section 26 causes the light receiving section 90 to move to a predetermined direction at plural speeds plural times is effective for generating an image in which a plurality of subjects are focused respectively when the plurality of subjects moving at the different speeds each other are included within the image-capturing range. For example, it assumes that the image-capturing range includes a first subject moving to a first direction at a first speed, and a second subject moving to a first direction at a second speed. In this case, the movement control section 26 controls the light receiving section 90 to move to the first direction at a plurality of different speeds and receive light at each of the plurality of different speeds. Then, the captured image acquired section 45 acquires a plurality of captured images from the lights received by the light receiving section 90 at each of the different speeds. Thereby the image generating section 60 can extract the captured image in which each of the first subject and the second subject has lesser amount of blurring among the plurality of captured images and generate a composite image in which the first subject and the second subject are little blurred. Therefore, the user can clearly identify each of the plurality of subjects from the generated composite image even if the plurality of subjects moving at the different speeds are included within the image-capturing range.

The captured image acquiring section 45 acquires a first captured image from the light received by the light receiving section 90 while the light receiving section 90 moves to the first direction. Additionally, the captured image acquiring section 45 acquires a second captured image from the light received by the light receiving section 90 while the light receiving section 90 moves to the second direction. Further, the captured image acquiring section 45 may acquire each of the captured images from the lights received by the light receiving section 90 while the light receiving section 90 moves each of the plurality of directions. Then, the captured image acquiring section 45 provides the acquired captured images to the image generating section 60. The image generating section 60 generates capturing range image information by combining the first captured image and the second captured image which are received from the captured image acquiring section 45. Specifically, the image generating section 60 compares the amount of blurring of the subject in the first captured image with that of the subject in the second captured image, and combines the image of region of the subject which is blurred in the first captured image less than in the second captured image with the image of the region of subject which is blurred in the second captured image less than in the first captured image to generate the capturing range image information.

For example, the image generating section 60 analyzes the spatial frequency component of each of the regions of the subjects in the first captured image and the second captured image. Then the image generating section 60 may determine that the range of the subject in the captured image where the high frequency component of the spatial frequency is more than a predetermined level is a region in which the amount of blurring of the subject is least in the captured image. Then, the image generating section 60 may compare the region in the first captured image where the amount of blurring of the subject is least with the region in the second captured image where the amount of blurring of the subject is least and combine the image of region of the subject which is blurred in the first captured image less than in the second captured image with the image of the region of subject which is blurred in the second captured image less than in the first captured image.

Additionally, the image generating section 60 compares the amount of blurring of the subject in the first captured image with that of the subject in the second captured image, and combines the image of region of the subject which is blurred in the first captured image more than in the second captured image with the image of the region of subject which is blurred in the second captured image more than in the first captured image to generate capturing range image information. Then, the image generation section 60 provides the generated capturing range image information to the image output section 80. The image output section 80 displays the capturing range image information received from the image generating section 80 on a display device such as a monitor. Additionally, the image output section 80 may print images on medium such as papers using the capturing range image information.

The image capturing apparatus 100 according to the present embodiment captures a plurality of images within the image-capturing range while the image capturing section 30 moves to the plurality of directions approximately perpendicular to the image-capturing direction, respectively. Then, the image capturing apparatus 100 can generate a composite image by extracting the portion having little blurring of the subject from the plurality of captured images. Thereby the user can easily generate a composite image in which each of a plurality of subjects can be clearly identified without setting a complicated image-capturing condition to the image capturing apparatus 100.

Figure 10:
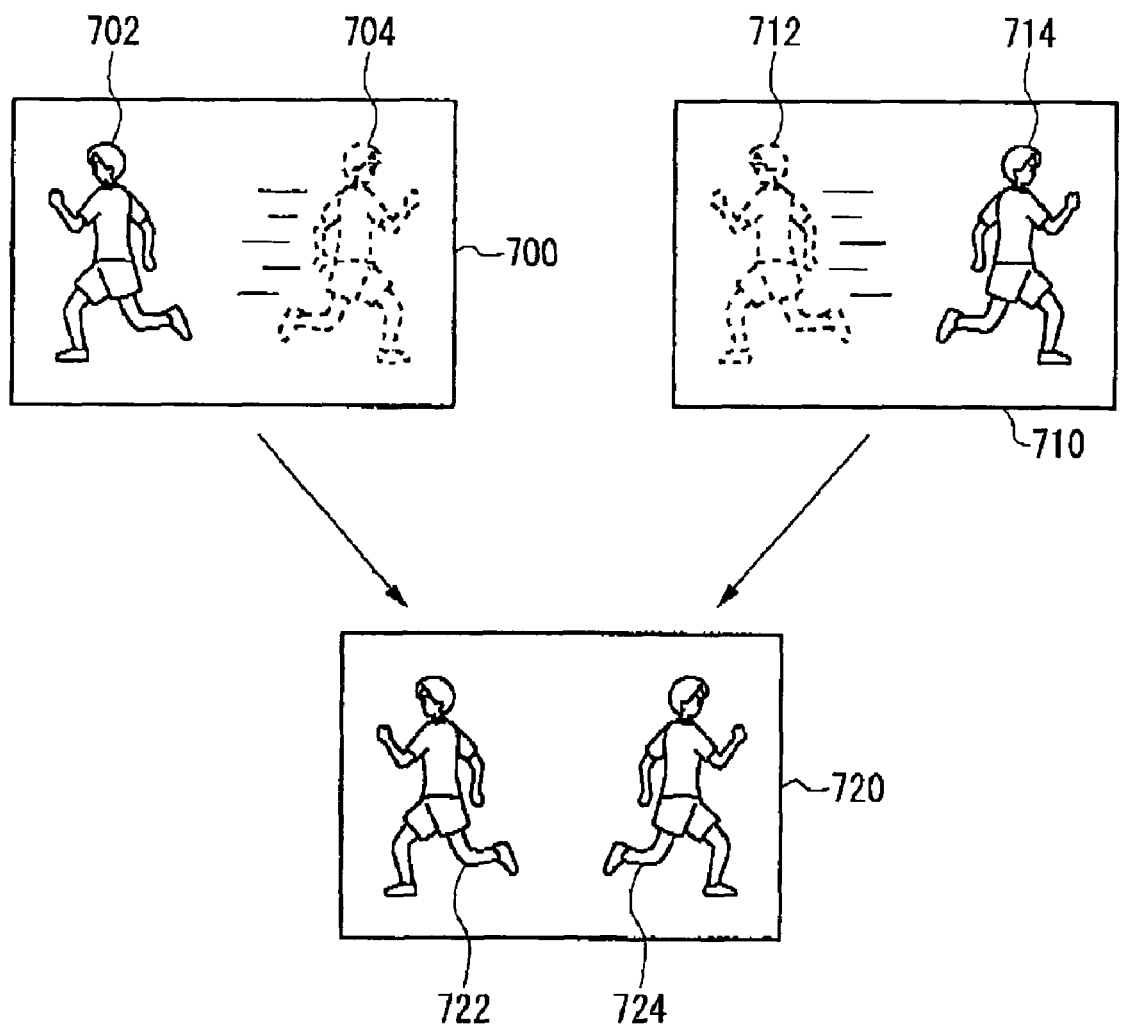
FIG. 10 shows a process of generating capturing range image information by the image generating section 60.

FIG. 10 shows an example of the process of generating capturing range image information by the image generating section 60 according to the present embodiment. Firstly, the captured image acquiring section 45 acquires a captured image 700 from the light received by the light receiving section 90 while the movement control section 26 moves the image capturing section 30 to the moving of a subject 702. Additionally, the captured image acquiring section 45 acquires a captured image 710 from the light received by the light receiving section 90 from the image-capturing region same as the region in which the captured image 700 is captured while the movement control section 26 moves the image capturing section 30 to the moving direction of a subject 712. In the captured image 700, the amount of blurring of the subject 702 is less than that of the subject 704 and the moving direction of the subject 704 is opposite to that of the image capturing section 30, so that the image of the subject 704 is a burring image. Meanwhile, in the captured image 710, the amount of burring of the subject 714 is less than that of the subject 712 and the moving direction of the subject 712 is opposite to that of the image capturing section 30, so that the image of the subject 712 is a blurring image.

The image generating section 60 analyzes each of the captured image 700 and the captured image 710 which are acquired by the captured image acquiring section 45, and combines the image of the region having little blurring of the subject 702 included in the captured image 700 with the image of the region having little blurring of the subject 714 included in the captured image 710 to generate a composite image 720. In the composite image 720 generated by the image generating section 60, the user can clearly identify each of a subject 722 and a subject 724 because each of the subject 722 and the subject 724 is little blurred. Additionally, the image generating section 60 may compare the amount of blurring for each of the plurality of subjects included in the captured images and extract each of the images of regions having lager amount of blurring, respectively to generate a composite image. For example, the image generating section 60 compares the amount of blurring of the subject 702 with that of the subject 704 in the captured image 700, and extracts the image of the subject 704 having the larger amount of blurring. In the same way, the image generating section 60 extracts the image of the subject 712 from the captured image 710. Then, the image generating section 60 may combine the image extracted from the captured image 700 with the image extracted from the captured image 510 to generate a composite image in which each of the subjects included in the image-capturing range is blurred. Further, the image generating section 60 may compare the amount of blurring for each of the plurality of subjects included in the captured image, and extract the image of the region in which one subject has the larger amount of blurring and the image of the region in which the other subjects have the lesser amount of blurring to generate a composite image.

The image capturing apparatus 100 according to the present embodiment can capture images within the image-capturing range while the image capturing section 30 is moved along the moving direction of the subject. Therefore, the image in which the subject is little blurred can be acquired without purposely capturing at an increased shutter speed in order to acquire a captured image in which the subject within the image-capturing range is little blurred. Additionally, it can prevent from occurring underexposure involved in capturing the image at an increased shutter speed. Further, the image capturing apparatus 100 according to the present embodiment can capture images within the image-capturing range while the image capturing section 30 is moved to the direction opposite to the moving direction of the subject. Therefore, the image in which the subject is blurred can be acquired without purposely capturing the image at decreased shutter speed in order to acquire the captured image in which the subject is blurred and swept. Additionally, it can prevent from occurring overexposure involved in capturing the image at an decreased shutter speed.

Figure 11:
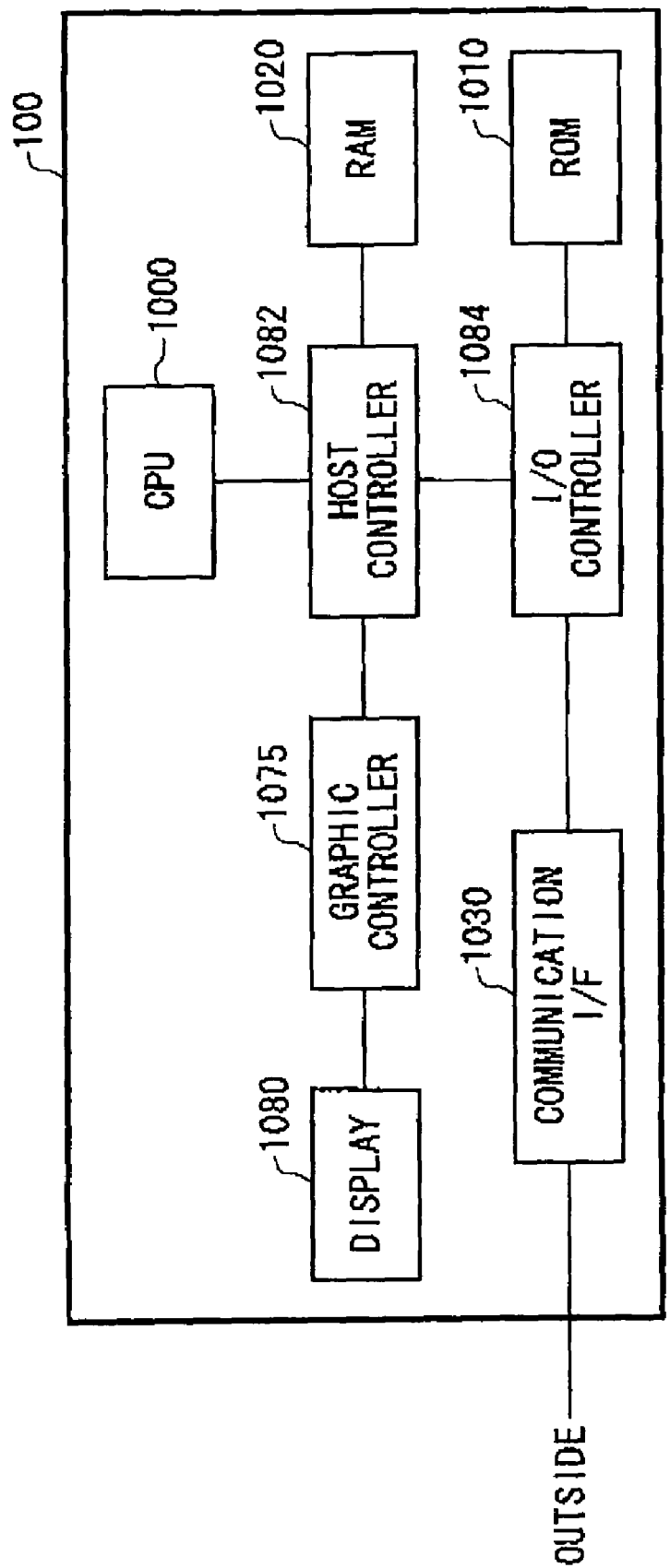
FIG. 11 is a block diagram showing a hardware configuration of the image capturing apparatus 100.

FIG. 11 is an example of the hardware configuration of the image capturing apparatus 100 according to the present embodiment. The image capturing apparatus 100 includes a CPU periphery having a CPU 1000, a RAM 1020, a graphic controller 1075 and a display 1080 which are connected through a host controller 1082 each other, and an input/output unit having a communication interface 1030 and a ROM 1010 which are connected to the host controller 1082 through an input/output controller 1084.

The host controller 1082 connects the RAM 1020 to the CPU 1000 and the graphic controller 1075 which access the RAM 1020 with a high transfer rate. The CPU 1000 operates according to the programs stored in the ROM 1010 and the RAM 1020 to control each unit. The graphic controller 1075 obtains image data generated on a frame buffer provided in the RAM 1020 by the CPU 1000 and displays the same on the display 1080. Alternatively, the graphic controller 1075 may include therein a frame buffer for storing image data generated by the CPU 1000.

The input/output controller 1084 connects the communication interface 1030 which is a relatively high-speed input/output unit to the host controller 1082. The communication interface 1030 communicates with the other units through a network. The ROM 1010 is connected to the input/output controller 1084. The ROM 1010 stores a boot program executed by the CPU 100 at activating the image capturing apparatus 100 and a program depending on the hardware of the image capturing apparatus 100.

A program provided to the image capturing apparatus 100 is installed in the image capturing apparatus 100 through the network and executed in the image capturing apparatus 100. The program installed and executed in the image capturing apparatus 100 operates the image capturing apparatus 100 to function as the multipoint distance measurement section 10, the diaphragm control section 12, the focus distance calculating section 15, the focus control section 20, the exposure control section 22, the diaphragm control section 24, the movement control section 24, the image capturing section 30, the image-capturing control section 32, the light splitting section 37, the signal processing section 40, the captured image acquiring section 45, the frame image storage section 50, the image generating section 60, the moving image recording section 70, the mage output section 80, the light receiving section 90, the first light receiving section 92, the second light receiving section 94, the first light refractive index variable section 96, the second light refractive index variable section 97, the first light receiving position drive section 98 and the second light receiving position drive section 99.

The above-described program may be provided to the image capturing apparatus 100 by a storage unit such as a hard disk or a RAM provided in a server system connected to a private communication network and Internet through the network. Additionally, the program may stored in an optical storage medium such as a flexible disk, a CD-ROM, a DVD and a PD, a magneto-optical recording medium such as a MD, a tape medium and a semiconductor memory such as an IC card.

While the present invention have been described with the embodiment, the technical scope of the invention not limited to the above described embodiment. It is apparent to persons skilled in the art that various alternations and improvements can be added to the above-described embodiment. It is apparent from the scope of the claims that the embodiment added such alternation or improvements can be included in the technical scope of the invention.

What is claimed is:

1. An image recording output system for recording an image and outputting the same, comprising:
    a focus control section for sequentially focusing at a plurality of different focus distances within one image-capturing range;
    an image capturing section for capturing a first captured image within the image-capturing range when the focus control section focuses at a first focus distance, and for capturing a second captured image within the image capturing range when the focus control section focuses at a second focus distance;
    an image output section for superimposing the first captured image and the second captured image to output a superimposed image, wherein the image output section sequentially displays the first captured image and the second captured image to display the superimposed image; and
    a light refractive index variable section for refracting light from within the image-capturing range, the light refractive index variable section being formed of an electro-optic crystal that exhibits the Pockels effect or the Kerr effect.

2. The image recording output system according to claim 1, wherein the image output section outputs a composite image generated by superimposing the first captured image and the second captured image pixel by pixel.

3. The image recording output system according to claim 1, wherein the light refractive index variable section is formed of at least one of LiNbO3, LiTaO3, BaTiO3, PLZT, and KTN.

4. An image recording output method, comprising:
    forming a light refractive index variable section for refracting light from within an image-capturing range of an electro-optic crystal that exhibits the Pockels effect or the Kerr effect;
    sequentially focusing at a plurality of different focus distances within the image-capturing range;
    capturing a first captured image within the image-capturing range when a first focus distance is focused in the sequentially focusing;
    capturing a second captured image within the image-capturing range when a second focus distance is focused in the sequentially focusing;
    superimposing the first captured image and the second captured image to form a superimposed image; and
    sequentially displaying the first captured image and the second captured image to display the superimposed image.

5. The image recording output method according to claim 4, wherein the light refractive index variable section is formed of at least one of LiNbO3, LiTaO3, BaTiO3, PLZT, and KTN.

* * * * *